United States Patent
Jo et al.

(10) Patent No.: US 12,062,154 B2
(45) Date of Patent: Aug. 13, 2024

(54) IMAGE CORRECTION SYSTEM AND IMAGE CORRECTING METHOD THEREOF

(71) Applicant: ELECTRONICS AND TELECOMMUNICATIONS RESEARCH INSTITUTE, Daejeon (KR)

(72) Inventors: Young Joo Jo, Hwaseong (KR); Jong Youl Park, Daejeon (KR); Yu Seok Bae, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 406 days.

(21) Appl. No.: 17/436,516

(22) PCT Filed: Mar. 5, 2020

(86) PCT No.: PCT/KR2020/003129
§ 371 (c)(1),
(2) Date: Sep. 3, 2021

(87) PCT Pub. No.: WO2020/180134
PCT Pub. Date: Sep. 10, 2020

(65) Prior Publication Data
US 2022/0180490 A1 Jun. 9, 2022

(30) Foreign Application Priority Data
Mar. 6, 2019 (KR) .......... 10-2019-0026006
Oct. 18, 2019 (KR) .......... 10-2019-0130282

(51) Int. Cl.
G06T 5/50 (2006.01)
G06N 3/045 (2023.01)
G06N 3/08 (2023.01)

(52) U.S. Cl.
CPC .......... G06T 5/50 (2013.01); G06N 3/045 (2023.01); G06N 3/08 (2013.01);
(Continued)

(58) Field of Classification Search
None
See application file for complete search history.

(56) References Cited

U.S. PATENT DOCUMENTS

2019/0051057 A1  2/2019  Sommerlade et al.
2020/0137384 A1* 4/2020  Kwong ............... H04N 19/11
(Continued)

FOREIGN PATENT DOCUMENTS

JP  2018097807 A    6/2018
KR     10894278 B1   9/2018
KR  1020180120478 A  11/2018

OTHER PUBLICATIONS

Jiahui Yu, et al., "Free-Form Image Inpainting with Gated Convolution", arXiv preprint arXiv:1806.03589, 2018.
(Continued)

*Primary Examiner* — Leon Viet Q Nguyen

(57) ABSTRACT

An image correcting method of the present invention includes: a step of performing a preprocessing process on an original image to generate a mask image including only an erased area of the original image; a step of predicting, by using generative adversarial networks, an image which is to be synthesized with the erased area in the mask image; and a step of synthesizing the predicted image with the erased area of the original image to generate a new image.

15 Claims, 14 Drawing Sheets

(52) U.S. Cl.
CPC .............. *G06T 2207/20081* (2013.01); *G06T 2207/20084* (2013.01); *G06T 2207/20224* (2013.01); *G06T 2207/30201* (2013.01)

(56) References Cited

U.S. PATENT DOCUMENTS

| | | | |
|---|---|---|---|
| 2020/0279122 A1* | 9/2020 | Lee | G06N 3/088 |
| 2021/0217219 A1* | 7/2021 | Zhou | G06T 15/04 |
| 2021/0248418 A1* | 8/2021 | Guo | G06T 7/194 |

OTHER PUBLICATIONS

Tiziano Portenier, et al., "FaceShop: Deep Sketch-based Face Image Editing", arXiv preprint arXiv:1804.08972, 2018.

Youngjoo Jo et al., "SC-FEGAN: Face Editing Generative Adversarial Network with User's Sketch and Color", IEEE/CVF International Conference on Computer Vision (ICCV), Feb. 18, 2020, ETRI, South Korea.

* cited by examiner

IMAGE CORRECTION SYSTEM AND IMAGE CORRECTING METHOD THEREOF

TECHNICAL FIELD

The present invention relates to technology for correcting an image, and more particularly, to technology for correcting a face image.

BACKGROUND ART

Recently, persons sharing various information such as images through social networking service (SNS) is increasing, and based on such a trend, interest in an image editing program or application is increasing.

An image editing program (or an image editing tool) of the related art or an application relevant thereto corrects an image on the basis of a method of adjusting a pixel value of the image mainly. Substantially, a corrected image is determined based on a skilled level of a user who uses the image editing program.

Therefore, in a case where general users who are insufficient in technical knowledge or experience of the image editing program corrects an image by using the image editing program, there is a high possibility that a result thereof is not realistic and a corrected image is an awkward image.

In regard to editing an image, there is a method of editing, by using an engine (hereinafter, a three-dimensional (3D) model engine), a 3D model obtained by performing 3D modeling on an image. However, such a method needs a 3D model engine which implements a 3D model, there are various kinds of 3D model engines, and knowledge needed for a degree of completion or completion of a result differs for each 3D engine model used.

Moreover, there is a limitation in that a user should sufficiently acquaint a method of using each 3D model engine. That is, conventional methods are very difficult to realistically correct an image on the basis of only a simple image input.

DETAILED DESCRIPTION OF INVENTION

Technical Problem

An object of the present invention is directed to providing a face image correction system and a face image correcting method thereof, which easily and quickly provide a realistic synthesis image by using a neural network which has performed previous learning by using a face image and a user input.

That is, the present invention provides a system and a method, which enable a user to easily and intuitively correct a face image and to obtain a realistic result. An object of the present invention enables all users to easily correct a face image without needing technical knowledge or experience, for obtaining a realistic result.

Advantages and features of the present invention, and implementation methods thereof will be clarified through following embodiments described with reference to the accompanying drawings.

Technical Solution

An image correcting method according to an aspect of the present invention for accomplishing the above-described object includes: a step of performing a preprocessing process on an original image to generate a mask image including only an erased area of the original image; a step of predicting, by using generative adversarial networks, an image which is to be synthesized with the erased area in the mask image; and a step of synthesizing the predicted image with the erased area of the original image to generate a new image.

An image correction system according to another aspect of the present invention includes: a preprocessor performing a preprocessing process on an original image to generate a mask image including only an area, erased based on a user input, of the original image, a sketch image including only a shape sketched in the erased area on the basis of the user input, and a color image including only a color painted in the erased area on the basis of the user input; an image generator predicting, by using generative adversarial networks, an image to be synthesized with the erased area from the mask image, the sketch image, and the color image and synthesizing the predicted image with the erased area to generate a new image from the original image; and a display unit displaying the new image.

An image correcting method according to another aspect of the present invention includes: a step of allowing generative adversarial networks including a generative neural network and a discriminative neural network having an adversarial relationship therebetween to learn; a step of storing the learning-completed generative neural network in a storage unit; a step of generating a mask image including only an area, erased based on a user input, of the original image, a sketch image including only a shape sketched in the erased area on the basis of the user input, and a color image including only a color painted in the erased area on the basis of the user input, from an original image through a preprocessing process; a step of predicting, by using the generative neural network stored in the storage unit, an image to be synthesized with the erased area from the mask image, the sketch image, and the color image; and a step of synthesizing the predicted image with the erased area to generate a new image from the original image.

Advantageous Effect

According to the present invention, by correcting a face image by using an adversarial network, a user may quickly and easily correct the face image on the basis of a desired method without technical knowledge or experience of a separate image tool.

In a conventional image correction program, there is each corresponding tool for slenderizing a face or enlarging eyes, and much experience of users is needed for using the tool well.

However, a system provided in the present invention may not need a separate image tool and may correct a face image according to an intention of a user by using a mask, a sketch, or a color as input information.

BEST MODE FOR INVENTION

Figure 1:
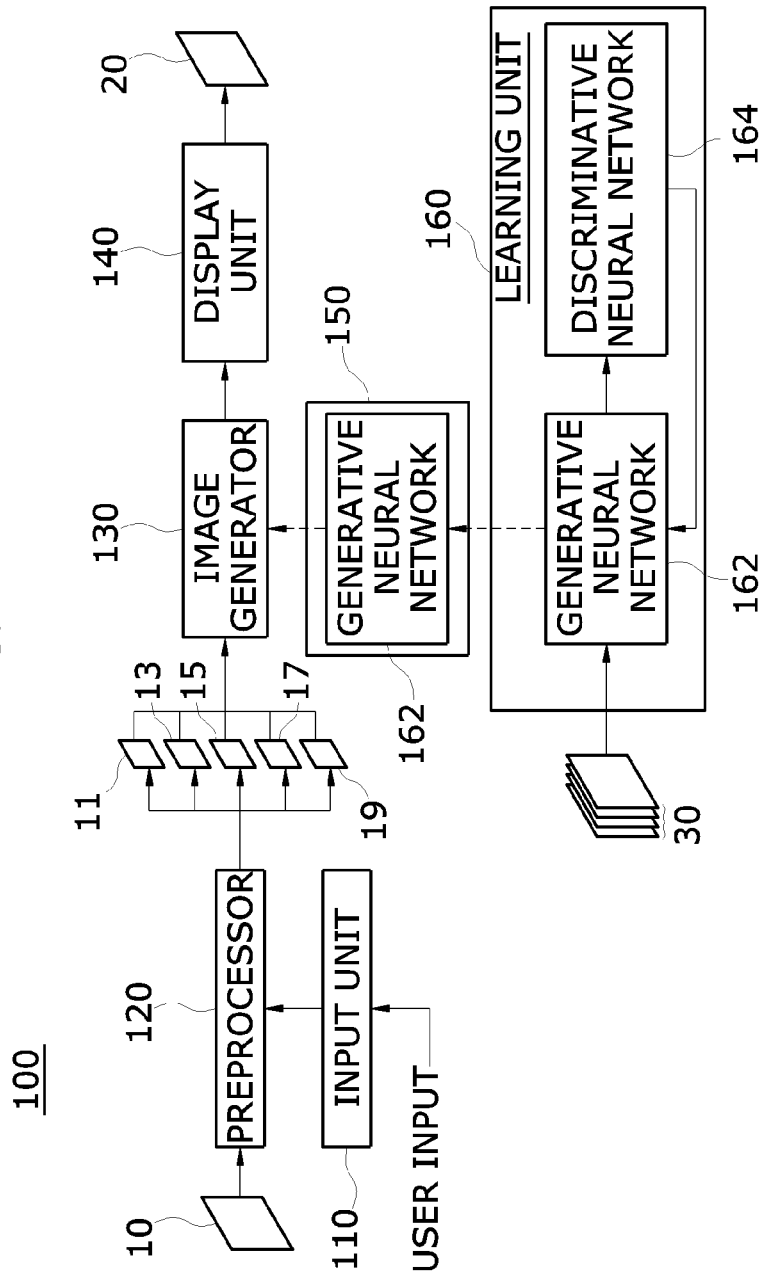
FIG. 1 is a block diagram of a face image correcting system according to an embodiment of the present invention.

In embodiments of the present invention disclosed in the detailed description, specific structural or functional descriptions are merely made for the purpose of describing embodiments of the present invention. Embodiments of the present invention may be embodied in various forms, and the present invention should not be construed as being limited to embodiments of the present invention disclosed in the detailed description.

Since the present invention may have diverse modified embodiments, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention.

It will be understood that although the terms including an ordinary number such as first or second are used herein to describe various elements, these elements should not be limited by these terms. These terms are only used to distinguish one element from another element. For example, a first element may be referred to as a second element without departing from the spirit and scope of the present invention, and similarly, the second element may also be referred to as the first element.

In the following description, the technical terms are used only for explain a specific exemplary embodiment while not limiting the present invention. The terms of a singular form may include plural forms unless referred to the contrary. The meaning of 'comprise', 'include', or 'have' specifies a property, a region, a fixed number, a step, a process, an element and/or a component but does not exclude other properties, regions, fixed numbers, steps, processes, elements and/or components.

Hereinafter, embodiments of the present invention will be described in detail with reference to the accompanying drawings. The present invention may, however, be embodied in different forms and should not be construed as limited to the embodiments set forth herein. Like reference numerals refer to like elements throughout.

FIG. 1 is a block diagram of an image correcting system according to an embodiment of the present invention.

Referring to FIG. 1, an image correcting system 100 according to an embodiment of the present invention may quickly and easily correct an image on the basis of a method desired by a user who has no technical knowledge or sufficient experience of a tool such as an image correction program.

The image correcting system according to the present embodiment is limited to correcting a face image. Hereinafter, therefore, the image correcting system is referred to as 'face image correction system'. However, the present invention is not restrictively applied to face image correction and may be applied to all kinds of image corrections associated with a vehicle design, an architecture design, an appliance design, etc.

In order to design a system which enables a user to easily and quickly correct a face image, the face image correction system 100 includes an input unit 110, a preprocessor 120, an image generator 130, a display unit 140, a storage unit 150, and a learning unit 160.

Input Unit 110

The input unit 110 is an element for transferring a user input to a layer generator 120 and includes a hardware means such as a keyboard, a mouse, a touch pad, and a touch panel and a software means (hereinafter referred to as 'user interface') programmed to cooperate with the hardware means.

A user may perform the following operations through the input unit 110.

An operation of erasing an area, which is to be corrected by the user, of an original face image 10.

An operation of performing a sketch in a shape (or a form), which is to be corrected by the user, in the erased area. Here, the sketch denotes a level enabling the shape to be recognized, and a sketch corresponding to an expert level is not needed.

An operation of painting the sketched shape in color which is to be corrected by the user.

According to an embodiment, an area which is to be corrected by a user includes an eye area, an ear area, a mouth area, a nose area, and a hair area in an original face image.

According to another embodiment, a color which is to be corrected by a user includes colors of pupils, colors of earrings, colors of lips, a hair color, etc.

The input unit 110 generates a first input value representing an erased area in an original image, a second input value representing a sketched shape (or form) of the erased area, and a third input value representing a color to be corrected by a user according to a user input corresponding to the operations and input the generated input values to the preprocessor 120.

Preprocessor 120

The preprocessor 120 preprocesses the original face image according to the first to third input values input from the input unit 110 to generate a preprocessed plurality of input images. The generated plurality of input images are used as information input to the image generator 130.

FIGS. 2A to 2E are diagrams for describing a plurality of input images input from a preprocessor to an image generator according to an embodiment of the present invention.

Figure 2A:
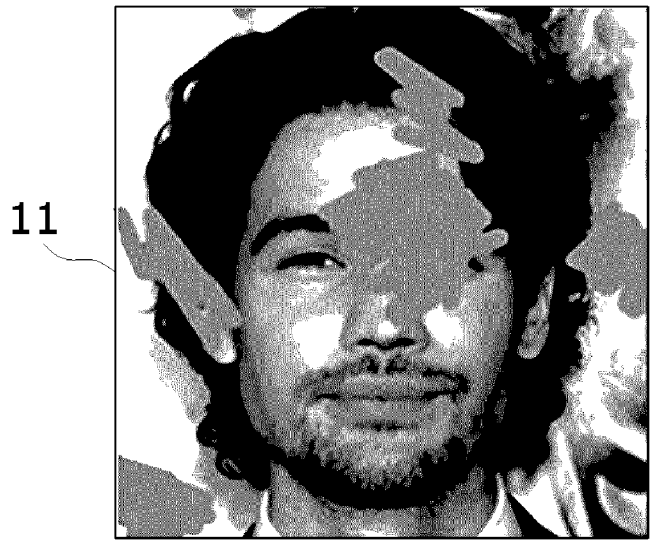
FIGS. 2A to 2E are diagrams for describing a plurality of input images input from a preprocessor to an image generator illustrated in FIG. 1
Figure 2B:
Figure 2C:
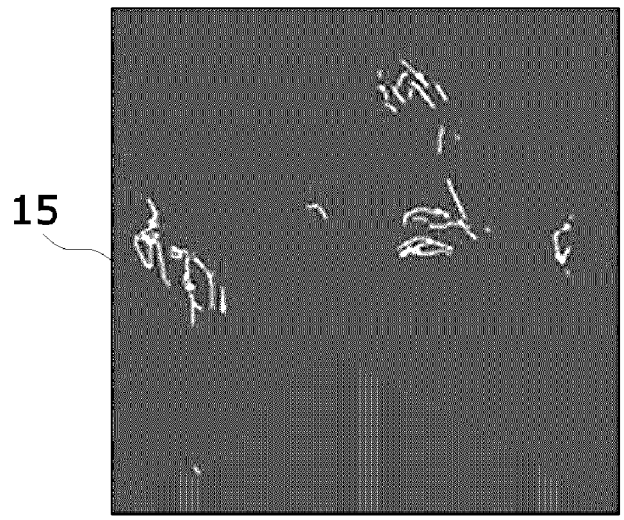
Figure 2D:
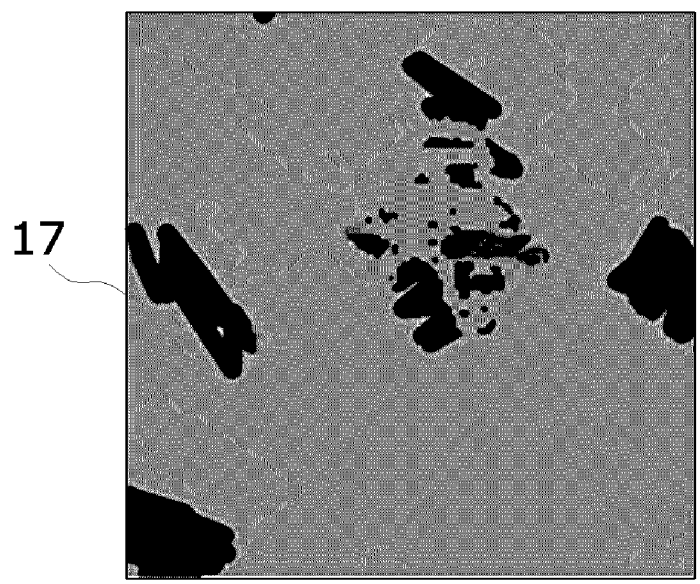
Figure 2E:
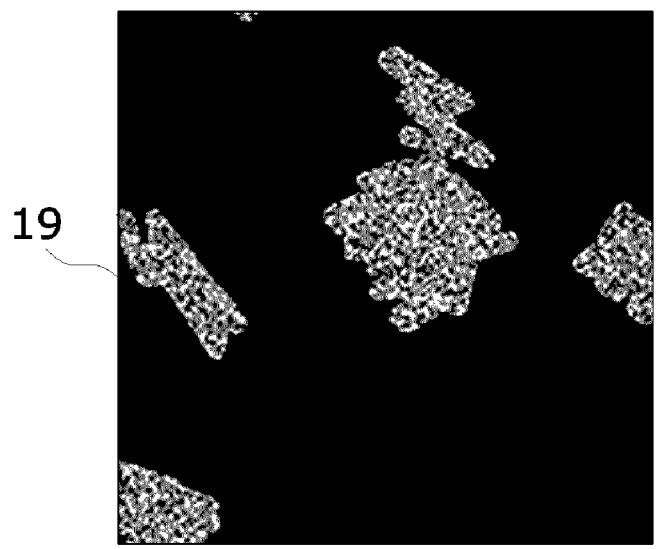

Referring to FIGS. 2A to 2E, a plurality of input images include an original face image 11 of FIG. 2A including an area erased by a user according to the first input value, a mask image 13 of FIG. 2B including only the erased area according to the first input value, a sketch image 15 of FIG. 2C representing only a shape sketched by the user in the erased area according to the second input value, a color image 17 of FIG. 2D including only a color appearing in the erased area according to the third input value, and a noise image 19 of FIG. 2E representing only Gaussian noise of the erased area.

Image Generator 130

Referring again to FIG. 1, the image generator 130 analyzes the plurality of input images input from the preprocessor 120 by using a previously learned neural network, predicts a realistic image to be synthesized with the erased area by the user in the original face image 10 according to a result of the analysis, and automatically synthesizes the predicted realistic image with the erased area of the original face image 10.

According to an embodiment, the previously learned neural network may be generative adversarial networks (GANs). Therefore, the image generator 130 corrects the original face image by using the GANs.

The GANs are deep neural network technology disclosed in a thesis written by researchers including Ian Goodfellow and Yoshua Bengio at Montreal University in 2014.

The thesis is applied to a detailed description of the GANs, and in the present specification, only the schematic operation principle of the GANs and portions corrected and modified to be applied to the present invention will be described.

The GANs have a deep neural network structure which is configured with a generative neural network 162 referred to as a generator and a discriminative neural network 164 referred to as a discriminator.

The generative neural network 162 generates a new image transferred to the discriminative neural network 164, and the discriminative neural network 164 determines whether the new image input from the generative neural network 162 is a real image or not.

The generative neural network 162 generates the new image, and the discriminative neural network 164 determines whether the new image input from the generative neural network 162 is a real image or not and feeds back a result of the determination to an input of the generative neural network 162.

At this time, the generative neural network 162 learns an image generating process so that the discriminative neural network 164 determines the new image generated thereby as a real image, and on the other hand, the discriminative neural network 164 learns an image determining process so as to determine the new image, input from the generative neural network 162, as a false image.

In this manner, the generative neural network 162 and the discriminative neural network 164 learn based on an objective function or a loss function opposite to each other like a zero-sum game. That is, the generative neural network 162 and the discriminative neural network 164 learn and evolve to maintain an adversarial relationship therebetween.

The image generator 130 generates a realistic image synthesized with an erased area of an original face image by using only the generative neural network 162, where learning is completed, among the generative neural network 162 and the discriminative neural network 164.

Storage Unit 150

The storage unit 150 stores the generative neural network 162 used by the image generator 130. The generative neural network 162 may be referred to as generative algorithms. Similarly, the discriminative neural network 164 may be referred to as discriminative algorithms. The storage unit 150 may be implemented with a volatile memory and a non-volatile memory.

Learning Unit 160

The learning unit 160 allows the GANs (i.e., the generative neural network 162 and the discriminative neural network 164) to learn by using previously collected big training data.

Here, the big training data includes a massive training face image, a massive training face image configured to include an erased area at different positions, a massive training mask image representing only the erased area, a massive training sketch image where various shapes are sketched in the erased area, a massive training color image where different colors are filled into the erased area, and a massive noise image.

Since the image generator uses only the generative neural network 162 among the generative neural network 162 and the discriminative neural network 164 where learning is completed, the learning unit 160 stores, in the storage unit 150, only the generative neural network 162 among the generative neural network 162 and the discriminative neural network 164 where learning is completed, and thus, the image generator 130 may use the generative neural network 162 stored in the storage unit 150.

Display Unit 140

The display unit 140 is an element which displays an image generated by the image generator 130, and thus, displays a synthesis image where a realistic image to be synthesized by a user is automatically synthesized with the erased area in the original face image 10 according to a user input. The display unit 140 may be a liquid crystal display, a light emitting diode (LED) display, an organic light emitting display, or the like.

Moreover, the display unit 140 displays a screen configuration of a user interface.

FIGS. 3 to 7 are diagrams illustrating a screen configuration of a user interface according to an embodiment of the present invention.

The user interface provides an input needed for a user to correct an original face image, namely, an environment for generating input information input from the image generator.

To this end, the screen configuration of the user interface includes an area 31 which displays the original face image and a process performed on the original face image and an area 32 which displays a corrected result (a synthesis image).

Moreover, the screen configuration of the user interface includes a plurality of icon-type buttons 33, 34, 35, 36, and 37 associated with generating of input information.

Figure 3:
FIGS. 3 to 7 are diagrams illustrating a screen configuration of a user interface according to an embodiment of the present invention.

First, referring to FIG. 3, the button 33 provides a load function of an original image. When a user touches or clicks the button 33, the original image is displayed on the area 31.

Figure 4:

Referring to FIG. 4, the button 34 provides a function of erasing an area, which is to be corrected by a user, in the original face image 10. For example, when the user touches or clicks the button 34, an eraser-type icon tool is generated, and the user erases a portion, which is to be corrected, of the original face image 10 by using the eraser-type icon tool. FIG. 4 illustrates a case where an area, which is to be corrected by the user, of the original face image 10 includes an eye area, a nose area, and a lip area.

Figure 5:
Figure 6:

Referring to FIG. 5, the button 35 provides a function of sketching a shape, which is to be corrected by the user, in the erased area of the original face image 10. For example, when the user touches or clicks the button 35, a pen-type icon tool is generated, and the user sketches a shape, which is to be corrected, in the erased area of the original face image 10 by using the pen-type icon tool. In this case, the sketch denotes a level which enables the shape to be recognized, and a sketch corresponding to an expert level is not needed Referring to FIG. 6, the button 36 provides a function of painting the sketched shape in a color which is to be corrected by the user. For example, when the user touches or clicks the button 36, a brush-type icon tool is generated, and the user paints the sketched shape or a peripheral region thereof in a color determined by the user by using the brush-type icon tool. FIG. 6 illustrates a case where pupils are painted in a color determined by the user.

Figure 7:
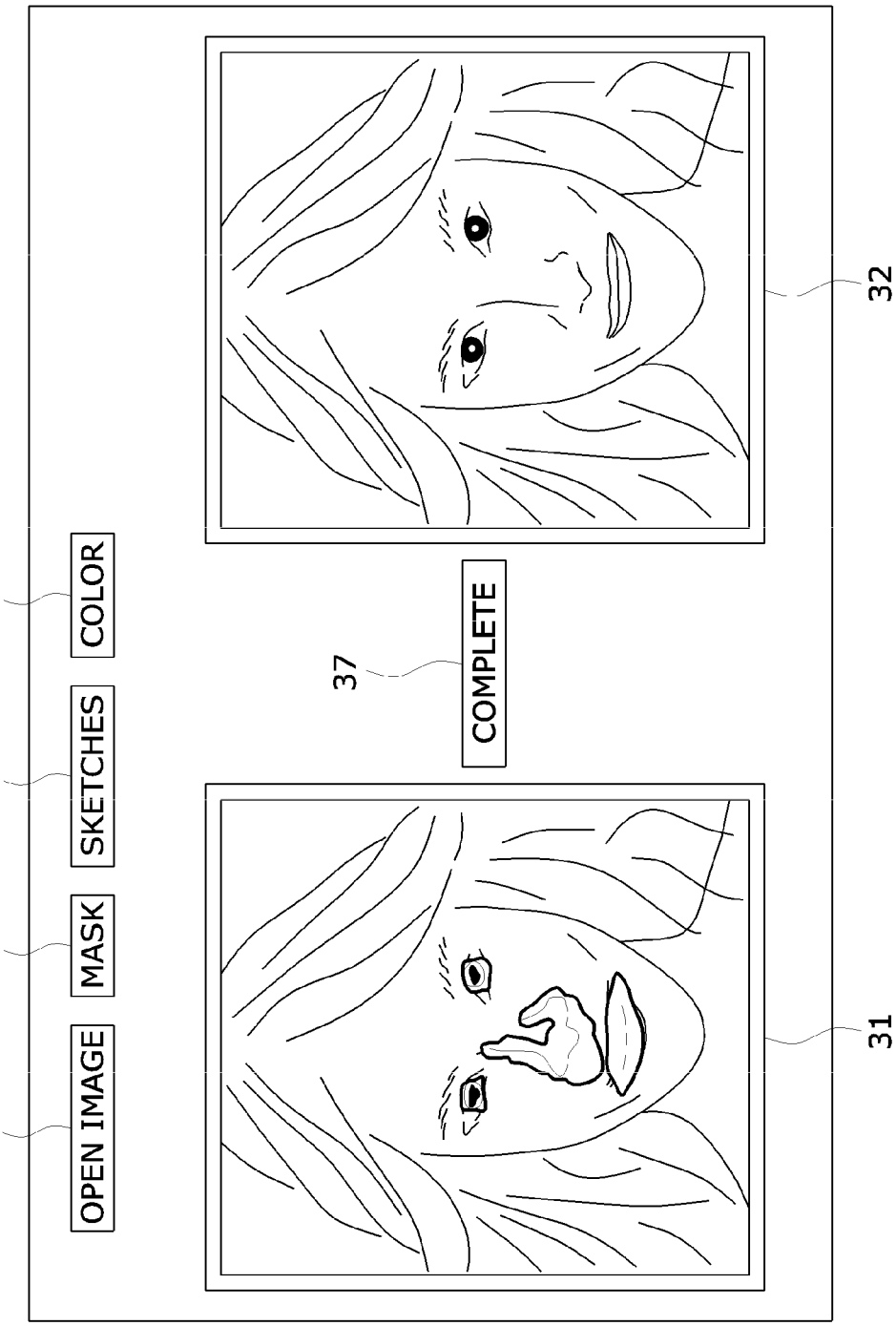

Referring to FIG. 7, the button 37 provides a function of displaying a corrected result. For example, when the user touches or clicks the button 37, the area 32 displays a synthesis image where a realistic image to be synthesized by a user is automatically synthesized with the erased area in the original face image 10 according to a user input.

FIG. 7 illustrates an example where a nose-shaped image, a lip-shaped image, and a pupil color image corrected in an image generating process of the generative neural network 162 are synthesized with the original face image.

FIG. 7 illustrates an example where the generative neural network 162 generates a synthesized image by using all input information generated based on a mask operation (an operation of erasing an area, which is to be corrected by the user, in the original face image), a sketching operation, and a coloring operation, but all input information is not needed for generating the synthesized image.

For example, the generative neural network 162 may generate the synthesized image by using only one piece of input information (i.e., a mask image) generated based on the mask operation.

This is because the generative neural network 162 has learned by using big training data (i.e., all of a massive mask image, a massive sketch image, and a massive color image).

This also denotes that the mask image representing a position of an area to be corrected by the user in the original face image 10 should be necessarily used as an input of the generative neural network 162. That is, the mask image may be construed as minimum information for notifying the generative neural network 162 of an intention of correction by the user.

As the amount of information input to the generative neural network 162 increases, a probability that a corrected face image which is the most suitable for an intention of correction by the user is the highest.

Figure 8:
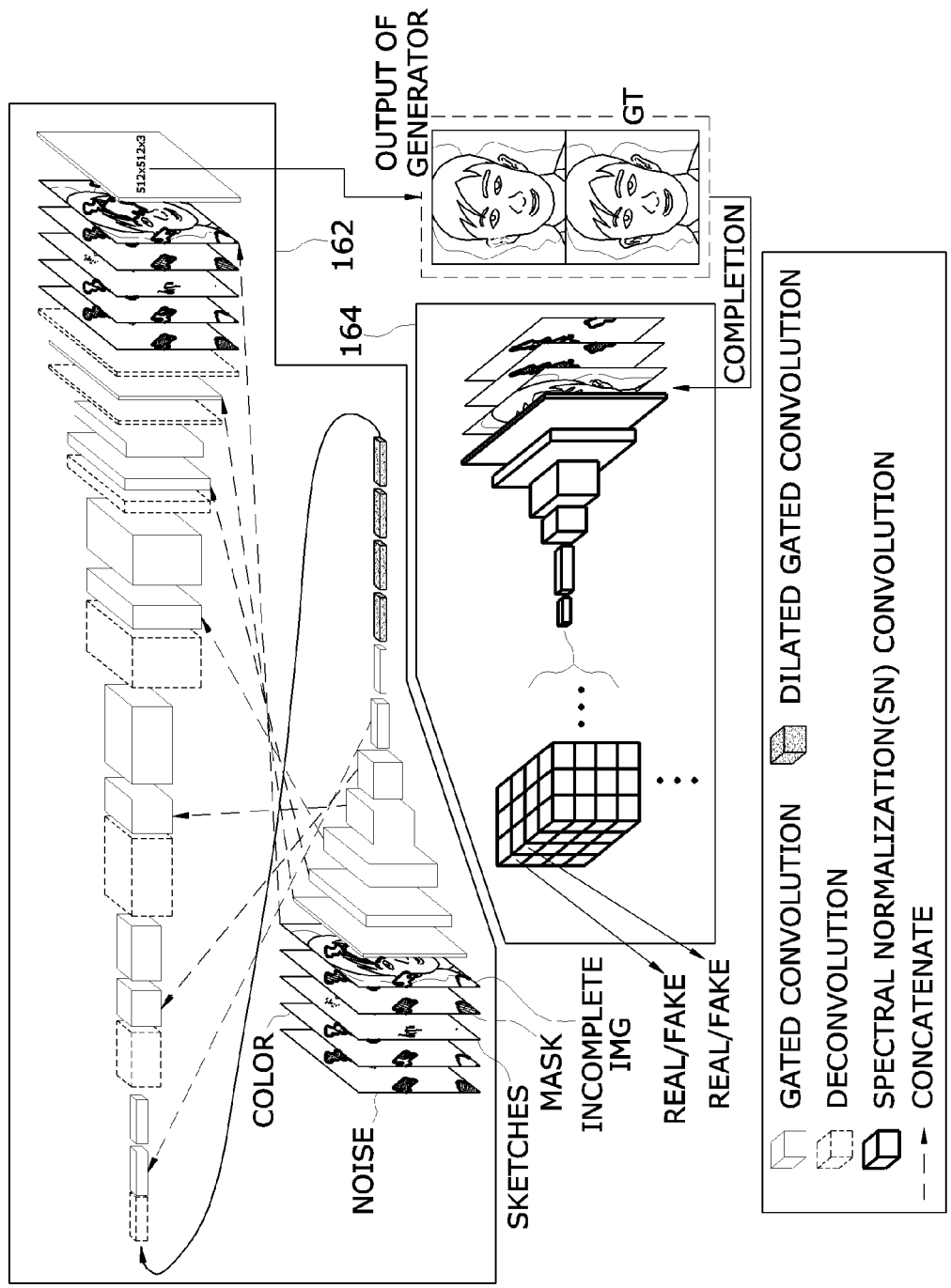
FIG. 8 is a diagram illustrating a total network structure of generative adversarial networks (GANs) applied to the present invention.

FIG. 8 is a diagram illustrating a total network structure of generative adversarial networks (GANs) applied to the present invention.

As described above, the GANs configured with the generative neural network 162 and the discriminative neural network 164 should learn together, for allowing the generative neural network 162 to learn.

When learning is completed, only the generative neural network 162 is used in correcting a face image, and thus, the GANs may be configured in a structure illustrated in FIG. 8, for enhancing a velocity of the generative neural network 162 and increasing the reality of a corrected face image.

As illustrated in FIG. 8, the generative neural network 162 is configured in a U-net structure and includes a gated convolution layer, a dilated gated convolution layer, and a deconvolution layer. Each of the convolution layers is illustrated in a hexahedral shape having different sizes on the basis of the number of channels.

The generative neural network 162 is characterized by using the gate convolution layer instead of a general convolution layer.

The general convolution layer outputs a different feature value with respect to a feature value input from a convolution layer of a front end. On the other hand, the gated convolution layer outputs a different feature value with respect to a feature input from a gated convolution layer of a front end and a feature value with respect to a mask image.

That is, there is a difference in that the general convolution layer outputs one piece of data and the gated convolution layer outputs two pieces of data.

One piece of data among two pieces of data output from the gated convolution layer is a feature value of the mask image, and the feature value of the mask image is input to another gated convolution layer which is not adjacent thereto. In FIG. 8, a dotted-line arrow represents that a feature value of a mask image output from a current gated convolution layer is an input of another gated convolution layer which is not adjacent thereto.

The discriminative neural network 164 is a patchGAN type including a gated convolution layer with spectral normalization applied thereto.

A process of learning the discriminative neural network 164 is the same as a method of allowing general GANs to learn a dataset.

However, a loss parameter Loss used for learning of the discriminative neural network 164 has a difference with general loss. Here, loss denotes a difference between the original face image and a new face image generated by the generative neural network 162.

A parameter $L_G$ used to allow the generative neural network 162 according to an embodiment of the present invention to learn is as follows, and a parameter $L_D$ used to allow the discriminative neural network 164 to learn is as follows.

$$L_G = L_{per\text{-}pixel} + \alpha L_{percept} + \beta L_{G,SN} + \gamma (L_{sytle}(I_{gen}) + L_{sytle}(I_{comp})) + \upsilon L_{tv} + \mathbb{E}[D(I_{gt})^2] \quad \text{[Equation 1]}$$

$$L_D = \mathbb{E}[1 - D(I_{gt})] + \mathbb{E}[1 + D(I_{comp})] + \theta L_{GP} \quad \text{[Equation 2]}$$

The parameter $L_G$ is a loss of allowing a layer of the generative neural network 162 to learn. Here, as illustrated in FIG. 8, the layer of the generative neural network 162 includes a plurality of gated convolution layers, a plurality of dilated gated convolution layers, and a plurality of deconvolution layers.

The parameter $L_D$ is a loss of allowing a layer of the discriminative neural network 164 to learn. Here, the layer of the discriminative neural network 164 includes a plurality of spectral normalization (SN) convolution layers.

$L_{per\text{-}pixel}$ in Equation 1 is expressed as the following Equation 3.

$$L_{per\text{-}pixel} = \frac{1}{N_{I_{gt}}} \|M \odot (I_{gen} - I_{gt})\|_1 + \alpha \frac{1}{N_{I_{gt}}} \|(1 - M) \odot (I_{gen} - I_{gt})\|_1 \quad \text{[Equation 3]}$$

Here, M is a pixel value of 1 channel representing an erased area included in the mask image, and for example, may be '1'. In this case, each pixel value of an area other than the erased area in the mask image is '0'.

$I_{gen}$ denotes an image where a different image is filled into an erased area in a new face image (i.e., an original face image) generated by the generated neural network 162 on the basis of receiving an original face image having an erased area, a mask image having only the erased area, a sketch image, a color image, and a noise image.

$I_{gen}$ may be a three-dimensional vector value where the new face image generated by the generative neural network 162 is expressed in a three-dimensional vector space.

$I_{gt}$ denotes an original face image having no erased area, and $I_{gt}$ may be a three-dimensional vector value where the original face image is expressed in a three-dimensional vector space.

$L_{per\text{-}pixel}$ may be a parameter for calculating a distance L1 between the new face image generated by the generative neural network and the original face image.

A distance L is a distance between a pixel of the new face image and a pixel of the original face image corresponding to the pixel.

A is a weight for reinforcing (decreasing) loss of an erased area in the original face image. ⊙ may be a sign representing element-wise multiplication, and $N_{I_{gt}}$ may be the total number of pixels based on an image size, and for example, may be 786432 (=512×512×3).

$L_{percept}$ in Equation 1 is expressed as the following Equation 4.

$$L_{percept} = \sum_q \frac{\|\Theta_q(I_{gen}) - \Theta_q(I_{gt})\|_1}{N_{\Theta_q(I_{gt})}} + \sum_q \frac{\|\Theta_q(I_{comp}) - \Theta_q(I_{gt})\|_1}{N_{\Theta_q(I_{gt})}} \quad \text{[Equation 4]}$$

$L_{percept}$ is one of losses used as style-loss. $\Theta_q$ denotes a feature of a $q^{th}$ layer of a generative neural network which has learned for image classification of a big training dataset.

$L_{percept}$ is loss of a feature calculated by units of pixels by using a conventional learned network. In N_θq(I_gt), N is the total number of pixels, and θq is a $q^{th}$ feature map of an artificial neural network which has learned a massive image for conventional image classification unlike a generative neural network. That is, N_θq(I_gt) is the total number of pixels of the $q^{th}$ feature map obtained by allowing the original face image to pass through an image classification artificial neural network.

$\|\sim\|_1$ is loss of the distance L1 and is a sum of absolute values of all pixel differences. $I_{comp}$ is a synthesis image where an image obtained by extracting only a portion corresponding to the erased area from the new face image $I_{gen}$ generated by the generative neural network 162 is synthesized with the original face image having an erased area.

$I_{gen}$ denotes an image generated through a prediction and/or inference process of the generative neural network 162, and $I_{comp}$ denotes an image generated through a process of synthesizing an original image having an erased area with an image (an image corresponding to the erased area) extracted from the image $I_{gen}$ generated by the generative neural network 162.

$I_{comp}$ may be a three-dimensional vector value which is expressed in a three-dimensional vector space.

Lstyle($I_{gen}$) in Equation 1 is expressed as the following Equation 5.

$$L_{style}(I) = \sum_q \frac{1}{C_q C_q} \left\| \frac{G_q(I) - G_q(I_{gt})}{N_q} \right\|_1 \quad \text{[Equation 5]}$$

$L_{style}$ is loss of a feature of a $q^{th}$ layer of a network which has learned for image classification of a big training dataset. A Gram matrix may be used for calculating $L_{style}$.

$C_q$ is the number of channels of the $q^{th}$ layer, $N_q$ is the total number of channels of the $q^{th}$ layer, and $G_q$ represents a Gram matrix value of the $q^{th}$ layer.

In addition, variance loss is used to allow the generative neural network 162 to learn.

The variance loss is loss representing a difference between the original face image and a new face image obtained by forcibly moving, by one pixel, all pixels of a new face image input from the generative neural network 162 by using the discriminative neural network 164.

The variance loss is expressed as the following Equation 6.

$$L_{tv-col} = \sum_{(i,j) \in R} \frac{\|I_{comp}^{i,j+1} - I_{comp}^{i,j}\|_1}{N_{comp}} \quad \text{[Equation 6]}$$

$$L_{tv-row} = \sum_{(i,j) \in R} \frac{\|I_{comp}^{i+1,j} - I_{comp}^{i,j}\|_1}{N_{comp}}$$

The variance loss includes $L_{tv-col}$ and $L_{tv-row}$, and a subscript "comp" in Equation 6 denotes an image where an image based on a user input is filled into an erased area in the original face image.

$N_{comp}$ is the total number of pixels of the new face image generated by the generative neural network 162.

The generative neural network 162 may learn to be touch to blurring by using the variance loss.

Finally, a gradient penalty term $L_{GP}$ is added as follows so that the discriminative neural network 164 does not converge to training data.

Here, a meaning of that the discriminative neural network 164 should not converge to the training data denotes that the discriminative neural network 164 should not learn at a higher level than that of the generative neural network 162. That is, the meaning denotes that the generative neural network 162 and the discriminative neural network 164 should learn at the same level so as to maintain an adversarial relationship therebetween.

$$L_{GP} = \mathbb{E}\left[(\|\nabla_U D(U) \odot M\|_2 - 1)^2\right] \quad \text{[Equation 7]}$$

As described above, when a process of allowing each of the generative neural network 162 and the discriminative neural network 164 to learn is completed to decrease the parameter $L_G$ and the parameter $L_D$, the image generator 130 generates the new face image by using only the generative neural network 162 subsequently.

Since the generative neural network 162 is lightweight in size, a time for generating the new face image is two seconds or less with respect to a general central processing unit (CPU).

Figure 9:
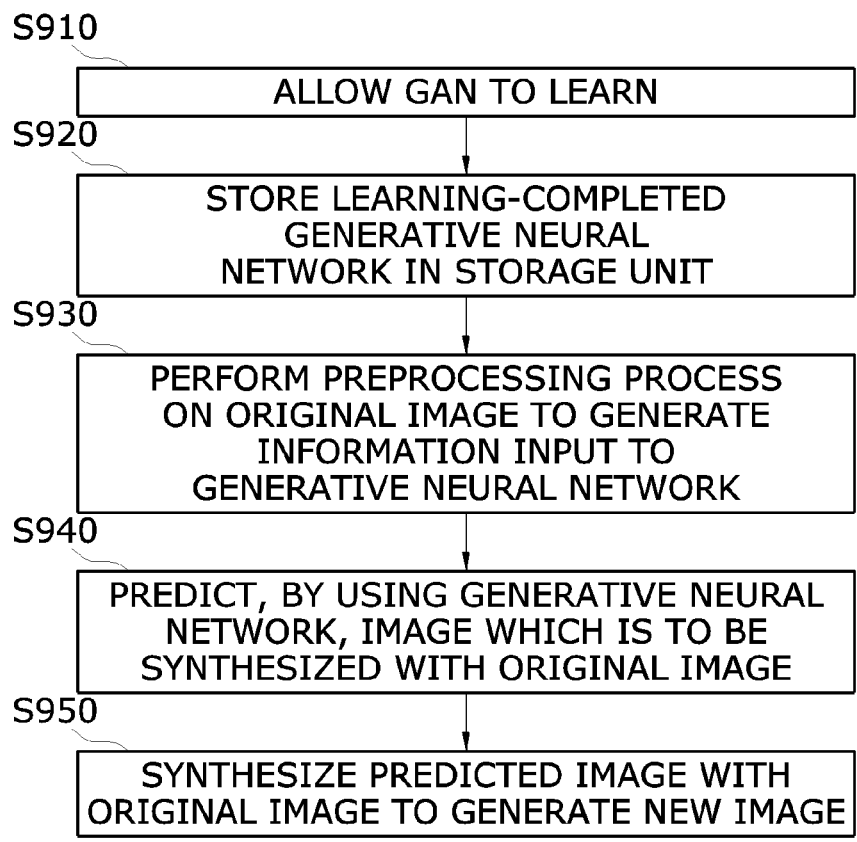
FIG. 9 is a flowchart illustrating an image correcting method according to an embodiment of the present invention.

FIG. 9 is a flowchart illustrating an image correcting method according to an embodiment of the present invention.

Referring to FIG. 9, in step S910, a process of allowing the GAN to learn is performed. Such a learning process is a process of allowing the generative neural network and the discriminative neural network to learn for maintaining an adversarial relationship therebetween.

Although described below, when learning of the generative neural network 162 and the discriminative neural network 164 is completed, an image which is to be synthesized with an original image is predicted by using only the generative neural network, and the predicted image is synthesized with the original image.

Previously collected big training data is used for allowing the generative neural network 162 to learn. The big training data includes training original images, training mask images including only an erased area, training sketch images where various shapes are sketched in the erased area, and training color images where various colors are filled into the erased area.

In addition, the big training data may further include a noise image representing noise of the erased area. The generative neural network 162 may learn to maintain an adversarial relationship with the discriminative neural network 164, and loss $L_G$ output from the discriminative neural network 164 may be used.

A process of allowing the generative neural network 162 to learn is a process of allowing the generative neural network 162 to learn for decreasing the loss $L_G$. In this case, the loss $L_G$ includes a pixel difference value ($I_{gen}-I_{gt}$) between a pixel value M of an erased area of the training mask image included in the big training data, the original image, and the new image. Descriptions of Equations 1 and 3 described above are applied thereto.

Also, the process of allowing the generative neural network 162 to learn may be a process of allowing a gated convolution layer included in the generative neural network to learn by using the pixel difference value ($I_{gen}-I_{gt}$) between the pixel value M of the erased area of the training mask image included in the big training data, the original image, and the new image.

Subsequently, in operation S920, when a process of allowing the generative neural network 160 to learn is completed, namely, when learning of the generative neural network 162 and the discriminative neural network 164 is completed, a process of storing the learning-completed generative neural network 162 in the storage unit 150 is performed. Therefore, the image generator 130 may access the generative neural network 162.

Subsequently, in operation S930, a preprocessing process is performed on the original image, and information input to the learning-completed generative neural network 162 is generated from the original image 10 through the preprocessing process.

The information input to the generative neural network 162 includes a mask image including only an area, erased based on a user input, of the original image, a sketch image including only a shape sketched in the erased area on the basis of the user input, and a color image including only a color painted in the erased area on the basis of the user input.

In this case, the information input to the generative neural network 162 may include only the mask image including only the area, erased based on the user input, of the original image.

As described above, in the present invention, a portion of the original image may be corrected to be suitable for an intention of the user by merely inputting the mask image, including only position information about an area erased by the user, to the generative neural network 162.

Subsequently, in operation S940, the image generator 130 analyzes the mask image, the sketch image, and the color image by using a learning-completed GAN (i.e., the learning-completed generative neural network 162), and based on a result of the analysis, a process of predicting an image which is to be synthesized with the erased area of the original image is performed.

Subsequently, in operation S950, the image generator 130 synthesizes the predicted image with the erased area of the original image to generate a new image, and the display unit 140 displays the generated new image to provide the new image to the user.

Figure 10:
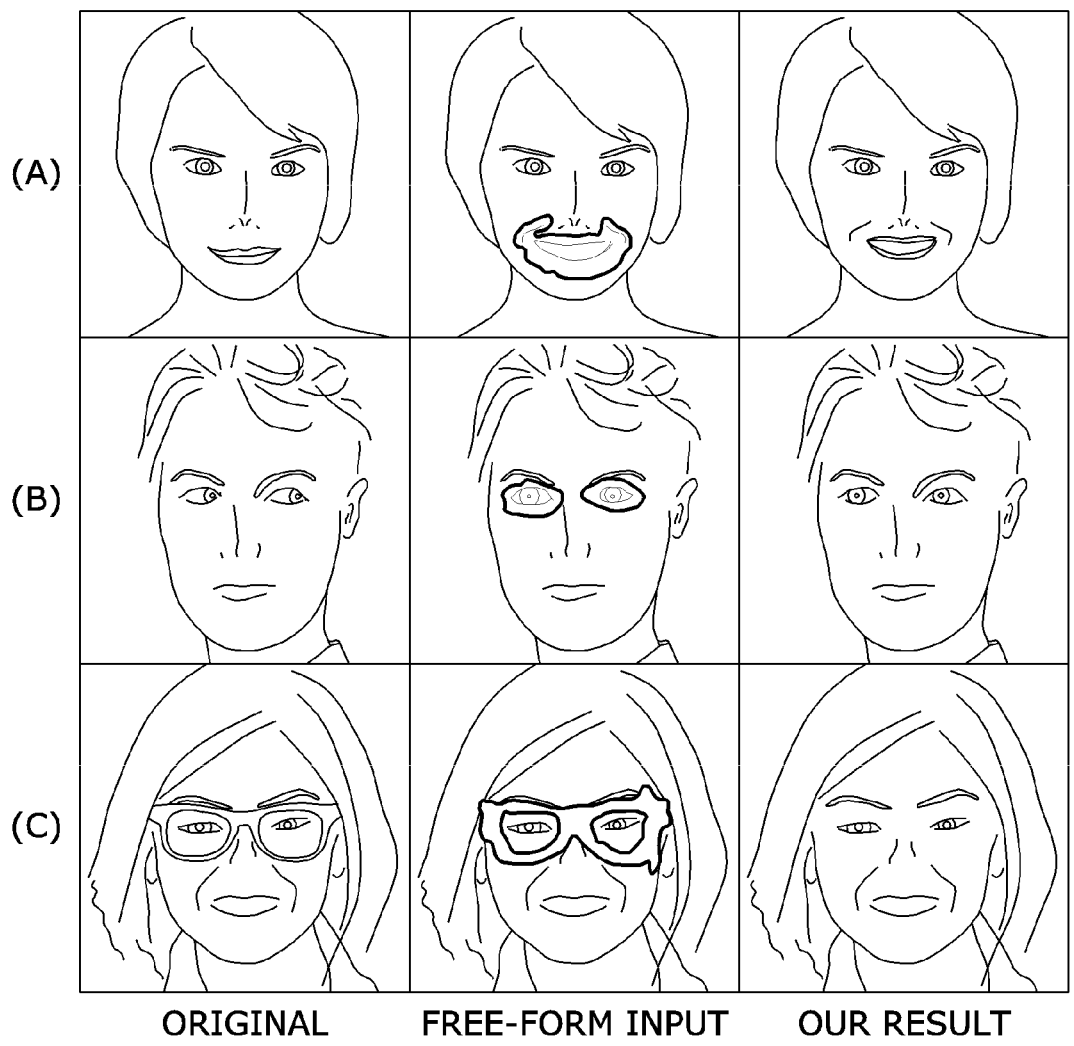
FIGS. 10 to 12 are diagrams illustrating resultant images obtained by correcting original images according to an image correcting method of the present invention.
Figure 11:
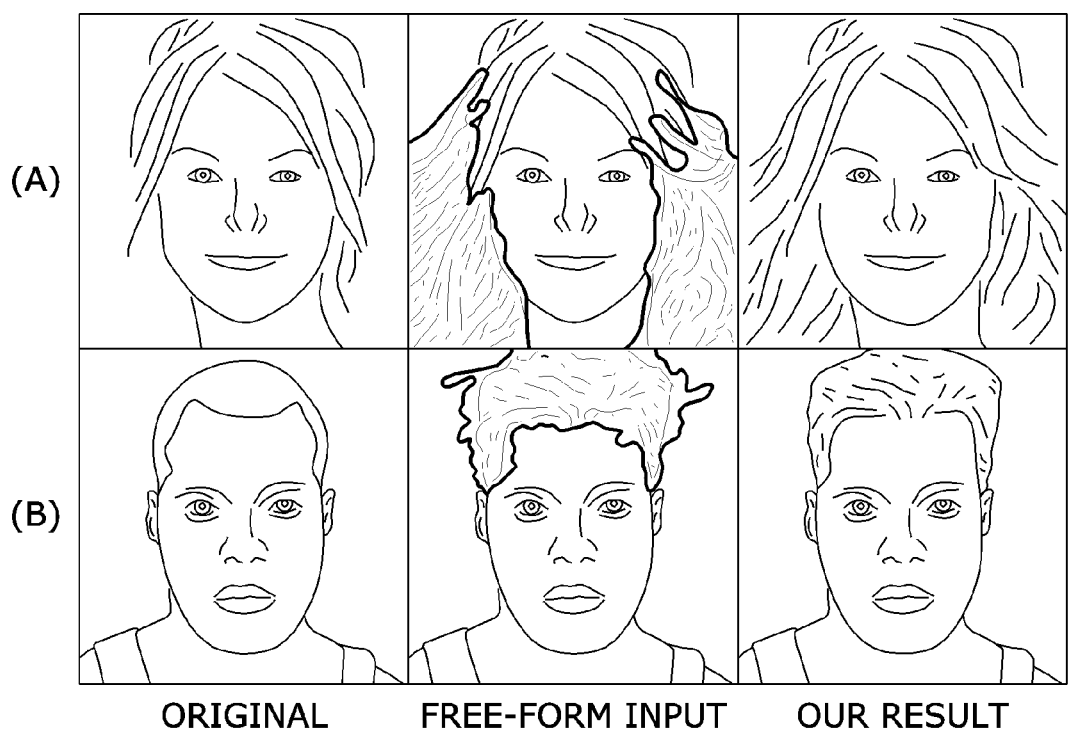
Figure 12:
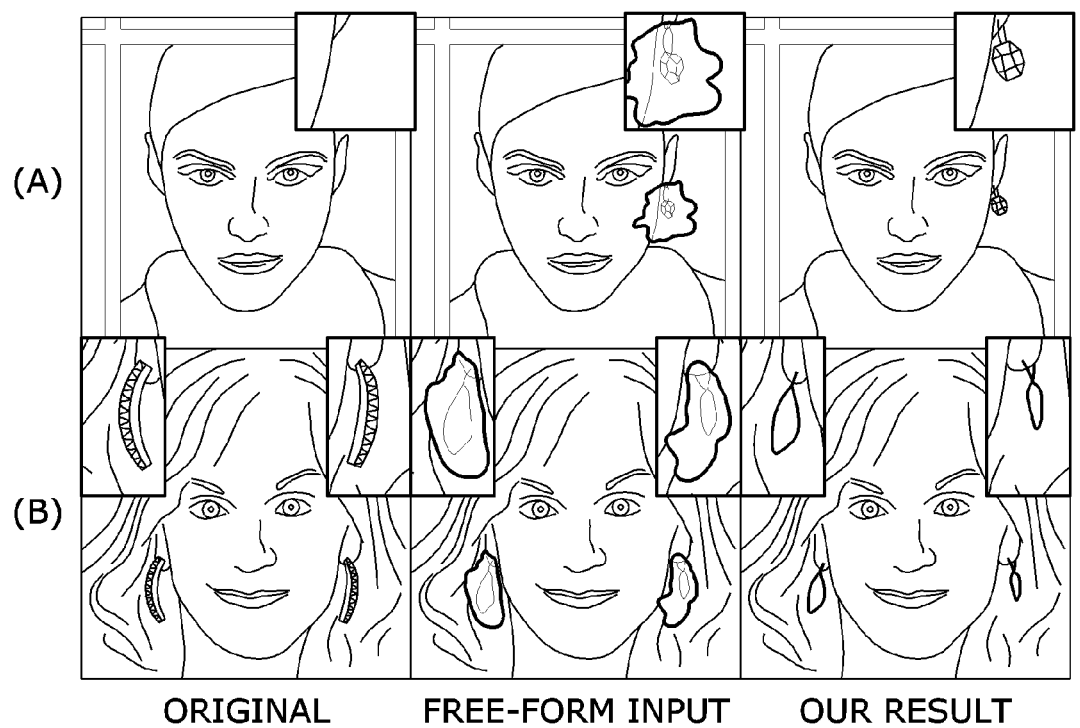

FIGS. 10 to 12 are diagrams illustrating synthesis images generated according to an image correcting method of the present invention.

As illustrated in FIGS. 10 (A) and (B), according to the present invention, a new image may be automatically generated by correcting a shape of a mouth and shapes of eyes in an original face image.

Moreover, as illustrated in FIG. 10 (C), a new image may be automatically generated by erasing glasses from an original face image.

Here, a significant point is that a shape sketched in an erased area for generating input information (free-form input) about a generative neural network does not need a sketch corresponding to an expert level.

Since the present invention uses a generative neural network which has previously learned by using big training data, an image to be synthesized with an original face image may be inferred and predicted based on only position information about an area erased from a mask image and a shape sketched at a general level.

This denotes that an original face image may be realistically corrected by using only a simple input of an image such as a mask image, a sketch image, or a color image.

Moreover, according to the present invention, as illustrated in FIG. 11 (A), a portion of a hair style may be corrected, or as illustrated in FIG. 11 (B), all of a hair style may be corrected.

Moreover, according to the present invention, as illustrated in FIG. 12 (A), an image where an earring image is realistically synthesized with the original face image may be automatically generated by erasing a partial region of an ear area in an original face image and providing the erased area with an earring shape simply sketched by a user as input information about a generative neural network.

Moreover, as illustrated in FIG. 12 (B), an earring included in an original face image may be corrected to an earring having a different shape.

The image correction system described above may be implemented with a hardware element, a software element, and/or a combination of a hardware element and a software element.

For example, the elements such as the preprocessor 120, the image generator 130, and the learning unit 160 described above in the embodiments may be implemented as, for example, a processor, a controller, an arithmetic logic unit (ALU), a graphics processing unit (GPU), a digital signal processor, a microcomputer, a field programmable gate array (FPGA), a programmable logic unit (PLU), and a microprocessor.

Moreover, the image correction system may perform an operating system (OS) and one or more software applications performed in the OS. Also, the image correction system may access, store, manipulate, process, and generate data in response to execution of software.

The method according to the embodiments may be implemented in the form of program instructions executable by various computer means and may be stored in a computer-readable storage medium. The computer-readable storage medium may include a program instruction, a data file, a data structure, or a combination thereof. The program instruction recorded in the storage medium may be specific to exemplary embodiments of the invention or commonly known to those of ordinary skill in computer software. Examples of the computer-readable storage medium include a magnetic medium, such as a hard disk, a floppy disk and a magnetic tape, an optical medium, such as a CD-ROM and a DVD, a magneto-optical medium, such as a floptical disk, and a hardware memory, such as a ROM, a RAM and a flash memory, specifically configured to store and execute program instructions.

Examples of the program instruction include machine code, which is generated by a compiler, and a high level language, which is executed by a computer using an interpreter and so on. The hardware apparatus may be configured to operate as one or more software modules for performing the operation of the present invention, and vice versa.

As described above, embodiments have been described with reference to limited embodiments and the drawings, but various corrections and modifications thereof may be made by those skilled in the art. For example, suitable results may be achieved if the described techniques are performed in a different order and/or if components in a described system, architecture, device, or circuit are combined in a different manner and/or replaced or supplemented by other components or their equivalents.

Accordingly, other implementations, other embodiments, and equivalents of claims are within the scope of the following claims.

The invention claimed is:

1. An image correcting method comprising:
 a step of performing a preprocessing process on an original image to generate a mask image including only an erased area of the original image;
 a step of predicting, by using generative adversarial networks, an image which is to be synthesized with the erased area in the mask image; and
 a step of synthesizing the predicted image with the erased area of the original image to generate a new image,
 wherein the method further comprises, before the step of generating the mask image, a step of allowing a generative neural network to learn by using big training data,
 wherein the big training data comprises training the original image, training the mask image including only the erased area, training sketch images where various shapes are sketched in the erased area, and training color images where various colors are filled into the erased area.

2. The image correcting method of claim 1, wherein
 the generative adversarial networks comprise a generative neural network and a discriminative neural network, which have learned to maintain an adversarial relationship therebetween, and
 the predicting step is a step of predicting the image to be synthesized by using the generative neural network.

3. The image correcting method of claim 1,
 wherein
 the step of allowing the generative neural network to learn comprises:
 allowing the generative neural network to learn by using the big training data; and
 allowing a discriminative neural network to learn to maintain an adversarial relationship with the generative neural network,
 wherein the predicting step is a step of predicting the image to be synthesized by using the learning-completed generative neural network.

4. The image correcting method of claim 3, wherein
 the step of allowing the generative neural network to learn is a step of allowing the generative neural network to learn by using loss LG output from the discriminative neural network, and
 the loss LG comprises a pixel difference value (Igen−Igt) between a pixel value M of an erased area of a training mask image included in the big training data, the original image, and the new image.

5. The image correcting method of claim 3, wherein the step of allowing the generative neural network to learn is a step of allowing a gated convolution layer included in the generative neural network to learn by using a pixel difference value (Igen −Igt) between a pixel value M of an erased area of a training mask image included in the big training data, the original image, and the new image.

6. An image correction system comprising:
 a preprocessor performing a preprocessing process on an original image to generate a mask image including only an area, erased based on a user input, of the original image, a sketch image including only a shape sketched in the erased area on the basis of the user input, and a color image including only a color painted in the erased area on the basis of the user input;
 an image generator predicting, by using generative adversarial networks, an image to be synthesized with the erased area from the mask image, the sketch image, and the color image and synthesizing the predicted image with the erased area to generate a new image from the original image; and
 a display unit displaying the new image.

7. The image correction system of claim 6, wherein
 the generative adversarial networks comprise a generative neural network and a discriminative neural network, which have learned to maintain an adversarial relationship therebetween, and
 the image generator predicts the image to be synthesized by using the generative neural network.

8. The image correction system of claim 6, further comprising:
 a learning unit allowing the generative neural network to learn by using big training data; and
 a storage unit storing the generative neural network where learning is completed by the learning unit,
 wherein the big training data comprises training original images, training mask images including only the erased area, training sketch images where various shapes are sketched in the erased area, and training color images where various colors are filled into the erased area.

9. The image correction system of claim 8, wherein
 the learning unit allows the generative adversarial networks including a generative neural network and a discriminative neural network to learn to maintain an adversarial relationship therebetween, and
 the storage unit stores the learning-completed generative neural network.

10. The image correction system of claim 9, wherein
 the learning unit allows the generative neural network to learn to decrease loss LG output from the discriminative neural network, and
 the loss LG comprises a pixel difference value (Igen−Igt) between a pixel value M of an erased area of the training mask image included in the big training data, the original image, and the new image.

11. The image correction system of claim 9, wherein the learning unit allows a gated convolution layer included in the generative neural network to learn by using the pixel difference value (Igen−Igt) between the pixel value M of the erased area of the training mask image included in the big training data, the original image, and the new image.

12. An image correcting method comprising:
 a step of allowing generative adversarial networks including a generative neural network and a discriminative neural network having an adversarial relationship therebetween to learn;
 a step of storing the learning-completed generative neural network in a storage unit;
 a step of generating a mask image including only an area, erased based on a user input, of the original image, a sketch image including only a shape sketched in the erased area on the basis of the user input, and a color image including only a color painted in the erased area on the basis of the user input, from an original image through a preprocessing process;

a step of predicting, by using the generative neural network stored in the storage unit, an image to be synthesized with the erased area from the mask image, the sketch image, and the color image; and a step of synthesizing the predicted image with the erased area to generate a new image from the original image.

13. The image correcting method of claim 12, wherein the learning step is a step of allowing a generative neural network and a discriminative neural network to learn to maintain an adversarial relationship therebetween, and the step of allowing the generative neural network to learn is a step of allowing a gated convolution layer included in the generative neural network to learn by using a pixel difference value (Igen−Igt) between a pixel value M of an erased area of a training mask image included in big training data, the original image, and the new image.

14. The image correcting method of claim 12, wherein, in the step of predicting the image to be synthesized with the erased area, the image to be synthesized is a realistic image predicted based on the shape sketched in the erased area.

15. The image correcting method of claim 12, wherein the original image is a face image.

* * * * *